US011069305B2

(12) United States Patent
Yoshida

(10) Patent No.: US 11,069,305 B2
(45) Date of Patent: Jul. 20, 2021

(54) DISPLAY DEVICE AND METHOD FOR DRIVING THE SAME

(71) Applicant: SHARP KABUSHIKI KAISHA, Sakai (JP)

(72) Inventor: Kazuaki Yoshida, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/850,835

(22) Filed: Apr. 16, 2020

(65) Prior Publication Data

US 2020/0365092 A1 Nov. 19, 2020

Related U.S. Application Data

(60) Provisional application No. 62/848,145, filed on May 15, 2019.

(51) Int. Cl.

*G09G 3/36* (2006.01)
*G06F 3/038* (2013.01)
*G09G 5/00* (2006.01)
*G09G 3/34* (2006.01)

(52) U.S. Cl.

CPC ... *G09G 3/3406* (2013.01); *G09G 2310/0237* (2013.01); *G09G 2320/064* (2013.01)

(58) Field of Classification Search

CPC ..................... G09G 3/2014; G09G 2320/0626
See application file for complete search history.

(56) References Cited

U.S. PATENT DOCUMENTS 5,844,540 A * 12/1998 Terasaki ............... G09G 3/3406 345/102
2004/0056825 A1* 3/2004 Min ................... H05B 41/3927 345/38
2010/0020108 A1* 1/2010 Cho ..................... G09G 3/3406 345/690

FOREIGN PATENT DOCUMENTS

JP 2004-126567 A 4/2004
JP 2007-328146 A 12/2007

* cited by examiner

*Primary Examiner* — Nan-Ying Yang
(74) *Attorney, Agent, or Firm* — ScienBiziP, P.C.

(57) ABSTRACT

A display device with a backlight includes a PWM signal generation circuit configured to generate a PWM signal, which alternates between an ON level at which the backlight is lit up and an OFF level at which the backlight is turned off, such that the luminance of the backlight is controlled by driving the backlight in accordance with the PWM signal. The PWM signal generation circuit divides a plurality of horizontal periods corresponding to a horizontal synchronization signal to be used for displaying an image for one frame, into a plurality of group periods each consisting of two or more horizontal periods, and generates the PWM signal such that the PWM signal is equal in frequency to the horizontal synchronization signal when the two or more horizontal periods included in each group period are regarded as one horizontal period, and such that the PWM signal is randomly modified every group period in terms of the time at which to change the PWM signal from the OFF level to the ON level.

4 Claims, 6 Drawing Sheets

DISPLAY DEVICE AND METHOD FOR DRIVING THE SAME

CROSS REFERENCE TO RELATED APPLICATIONS

This application claims priority to U.S. Provisional Patent Application No. 62/848,145, entitled "DISPLAY DEVICE AND METHOD FOR DRIVING THE SAME", filed on May 15, 2019, the content of which is incorporated herein by reference.

BACKGROUND OF THE INVENTION

1. Field of the Invention

The following disclosure relates to display devices and methods for driving the same, particularly to a liquid crystal display device in which the luminance of a backlight disposed on a back side of a liquid crystal panel is controlled by a pulse-width modulation (PWM) signal, as well as to a method for driving the same.

2. Description of the Background Art

In the case where an entire liquid crystal panel is backlit with a constant luminance, the luminance does not change during one frame, and therefore no noise occurs and appears as a wavy or horizontal stripe pattern on a screen (hereinafter, such noise that appears as a wavy or horizontal stripe pattern will be referred to as "beat noise"). However, in the case where backlight luminance is controlled by a PWM signal, which periodically switches between ON and OFF levels, beat noise might appear due to frequency interference between a PWM signal outputted by a PWM signal generation circuit and a horizontal synchronization signal included in an image signal.

There are various causes for the occurrence of such beat noise, and a conceivable main cause is due to optical characteristics of thin-film transistors (TFTs). TFTs are mainly made of amorphous silicon (a-Si) and disposed as switching elements in pixels formed on a liquid crystal panel. Amorphous silicon (a-Si) assumes the property of a conductor when such a TFT is irradiated with light, and also assumes the property of a nonconductor under no light irradiation. Accordingly, when compared to pixels under no light irradiation, pixels being irradiated with light have some increased parasitic capacitance, resulting in correspondingly increased capacitance in liquid crystal capacitors. Therefore, corresponding to the increased parasitic capacitance, the liquid crystal capacitor accumulates more charge with backlighting on than with backlighting off. When the backlight is turned off, the liquid crystal capacitor retains the accumulated charge but has a decreased capacitance value. Accordingly, a liquid crystal application voltage, which is a temporal average of the voltage retained in the liquid crystal capacitor, is higher in the case of writing an image signal with backlighting on than in the case of writing an image signal with backlighting off. Moreover, there is a semiconductor layer (N+) under source lines, which serve as data signal lines, and when the semiconductor layer is irradiated with light and thereby rendered conductive, a capacitance between the semiconductor layer and gate electrodes changes, resulting in a decreased pull-in voltage. This is also a possible reason why the liquid crystal application voltage is higher in the case of writing an image signal with backlighting on than in the case of writing an image signal with backlighting off.

FIG. 7 is a diagram illustrating the occurrence of beat noise due to a frequency difference between a PWM signal and a horizontal synchronization signal. As shown in FIG. 7, for example, in the first frame, when an image signal is written, a liquid crystal application voltage is higher with backlighting on due to the PWM signal being at the ON level than with backlighting off due to the PWM signal being at the OFF level, as described above. Accordingly, an image for a display line (j'th line) corresponding to a j'th scanning signal line to be selected with backlighting on (i.e., an image that is written with the PWM signal at the ON level) has a higher luminance than an image for a display line ((j+1)'th line) corresponding to a (j+1)'th scanning signal line to be selected with backlighting off (i.e., an image that is written with the PWM signal at the OFF level), with the result that high-luminance and low-luminance areas are displayed as respective stripes. In the second frame, the PWM signal is turned ON slightly earlier than in the first frame, since the PWM signal and the horizontal synchronization signal slightly differ in frequency. Accordingly, the image that is to be written with the PWM signal at the ON level appears slightly earlier than in the first frame. Therefore, the high-luminance area is displayed as a stripe on a display panel earlier than in the first frame. In this manner, dark and light stripes become noticeable in high-luminance areas appearing in the second frame in place of low-luminance areas that appeared in the first frame, and the viewer recognizes such stripes as beat noise.

As for a method for inhibiting such beat noise due to a change in optical characteristics of TFTs, Japanese Laid-Open Patent Publication No. 2004-126567 discloses that upon each generation of a pulse of a vertical synchronization start signal, ON or OFF time of a PWM signal is started in synchronization with the pulse generation, and a drive frequency of a lamp drive signal is synchronized with the timing of the vertical synchronization start signal, thereby removing beat noise due to a difference between the frequency of the vertical synchronization start signal and the drive frequency of the lamp drive signal. Moreover, Japanese Laid-Open Patent Publication No. 2007-328146 discloses that a PWM signal is synchronized with a horizontal synchronization signal for an image signal, thereby keeping dark and light stripes from moving on a screen.

The method described in Japanese Laid-Open Patent Publication No. 2004-126567 keeps beat noise at fixed positions on the screen, but the viewer sees contrast differences appear in the form of a stripe pattern, and therefore the method fails to sufficiently improve display quality. Moreover, the method described in Japanese Laid-Open Patent Publication No. 2007-328146 keeps boundaries between high-luminance and low-luminance areas of the scanning signal lines at the same positions in any frame, and therefore even if there are only slight luminance differences between these areas, the viewer can see the boundaries. Accordingly, display quality is not sufficiently improved.

SUMMARY OF THE INVENTION

Therefore, it is desired to inhibit the occurrence of beat noise on a display device with a backlight unit driven by a PWM signal and thereby achieve improved display quality.

(1) Display devices according to several embodiments of the present invention are each a display device including: a display portion with a plurality of pixels disposed thereon for image display;

a driver circuit configured to drive the pixels based on an externally provided input image signal;

a backlight unit configured to backlight the pixels and disposed on a back side of the display portion; and a PWM signal generation circuit configured to receive a backlight control signal and generate a PWM signal in accordance with the backlight control signal such that the backlight unit is driven with a luminance controlled by the PWM signal, wherein, the PWM signal generation circuit divides a plurality of horizontal periods corresponding to a horizontal synchronization signal to be used for displaying an image for one frame, into a plurality of group periods each consisting of two or more horizontal periods, and generates the PWM signal such that the PWM signal is equal in frequency to the horizontal synchronization signal when the two or more horizontal periods included in each group period are regarded as one horizontal period, and such that the PWM signal is randomly modified every group period in terms of a time at which to change the PWM signal from an OFF level at which the backlight unit is turned off to an ON level at which the backlight unit is lit up.

In this configuration, a plurality of horizontal periods corresponding to a horizontal synchronization signal to be used for displaying an image for one frame are divided into a plurality of group periods each consisting of two or more horizontal periods, the horizontal synchronization signal and the PWM signal are matched in terms of frequency when the two or more horizontal periods included in each group period are regarded as one horizontal period, and the time at which to change the PWM signal from the OFF level to the ON level during each group period is randomly modified. Accordingly, high-luminance and low-luminance areas displayed on lines are not fixed in position and appear as a mosaic-like stripe pattern. Thus, the viewer cannot distinguish luminance differences between the lines, resulting in improved quality of an image displayed on a liquid crystal panel screen.

(2) Moreover, display devices according to several embodiments of the present invention are each a display device including the configuration of above (1), wherein the PWM signal generation circuit generates the PWM signal such that the PWM signal is changed from the OFF level to the ON level once per group period.

(3) Moreover, display devices according to several embodiments of the present invention are each a display device including the configuration of above (1), wherein the PWM signal generation circuit generates the PWM signal such that the PWM signal is changed from the OFF level to the ON level during each group period and thereafter from the ON level to the OFF level during the each group period.

(4) Moreover, methods for driving display devices according to several embodiments of the present invention are each a method for driving a display device including a display portion with a plurality of pixels disposed thereon for image display, a driver circuit configured to drive the pixels based on an externally provided input image signal, and a backlight unit configured to backlight the pixels and disposed on a back side of the display portion, the method including:

a PWM signal generation step of receiving a backlight control signal and generating a PWM signal in accordance with the backlight control signal such that the backlight unit is driven with a luminance controlled by the PWM signal, wherein, in the PWM signal generation step, a plurality of horizontal periods corresponding to a horizontal synchronization signal to be used for displaying an image for one frame are divided into a plurality of group periods each consisting of two or more horizontal periods, and the PWM signal is generated so as to be equal in frequency to the horizontal synchronization signal when the two or more horizontal periods included in each group period are regarded as one horizontal period, and as so as to be randomly modified every group period in terms of a time at which to change the PWM signal from an OFF level at which the backlight unit is turned off to an ON level at which the backlight unit is lit up.

These and other objectives, features, modes, and effects of the invention will become more apparent from the following detailed description of the invention with reference to the accompanying drawings.

DESCRIPTION OF THE PREFERRED EMBODIMENTS

1. Configuration of the Liquid Crystal Display Device

Figure 1:
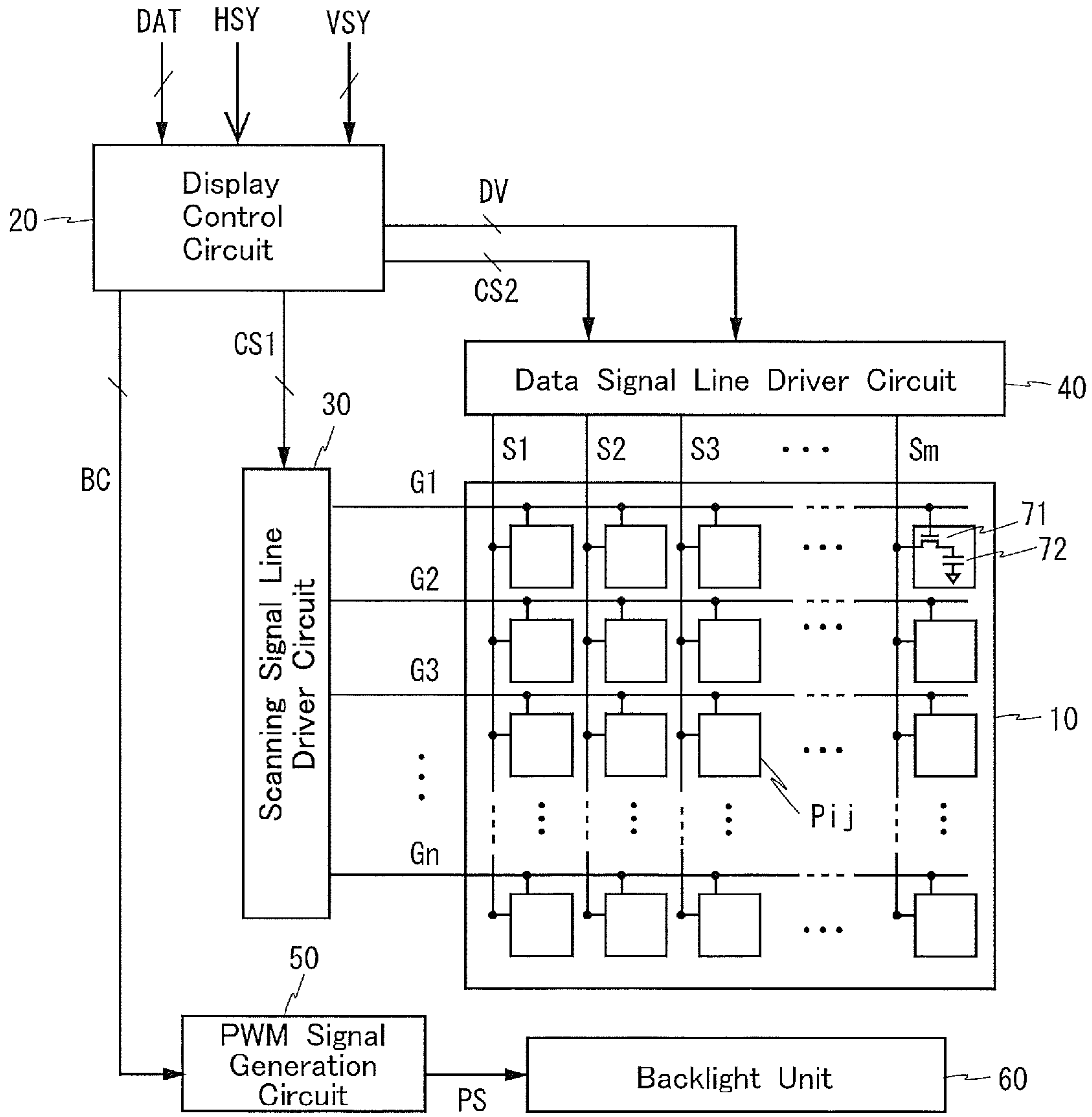
FIG. 1 is a block diagram illustrating the configuration of a liquid crystal display device according to an embodiment of the present invention.

FIG. 1 is a block diagram illustrating the configuration of a liquid crystal display device according to an embodiment of the present invention. As shown in FIG. 1, the liquid crystal display device includes a liquid crystal panel 10, a display control circuit 20, a scanning signal line driver circuit 30, a data signal line driver circuit 40, a PWM signal generation circuit 50, and a backlight unit 60.

The liquid crystal panel 10 includes n scanning signal lines G1 to Gn, m data signal lines S1 to Sm, and (m×n) pixels Pij (where m and n are integers of 2 or more, i is an integer from 1 to n, and j is an integer from 1 to m). The scanning signal lines G1 to Gn are arranged parallel to each other, and the data signal lines S1 to Sm are arranged parallel to each other so as to cross the scanning signal lines G1 to Gn. The pixels Pij are arranged near respective intersections of the scanning signal lines G1 and the data signal lines Sj. In this manner, the (m×n) pixels Pij are arranged in a matrix with each row consisting of m pixels and each column consisting of n pixels. The scanning signal line Gi is connected in common to the pixels Pij that are arranged in the i'th row, and the data signal line Sj is connected in common to the pixels Pij that are arranged in the j'th column.

The display control circuit 20 is externally provided with an input image signal, which includes image data DAT and control signals such as a horizontal synchronization signal HSY and a vertical synchronization signal VSY. In accordance with these signals, the display control circuit 20 generates a control signal CS1, which includes a gate clock signal GCK and a gate start pulse signal GSP, and outputs the generated signal to the scanning signal line driver circuit 30. Moreover, the display control circuit 20 generates a digital image signal DV and a control signal CS2, which includes a source start pulse signal SSP, a source clock signal SGK, and a latch strobe signal LS, and outputs the generated signals to the data signal line driver circuit 40.

The scanning signal line driver circuit 30 sequentially applies scanning signals to the n scanning signal lines G1 to Gn in accordance with the control signal CS1, in order that the applied signals respectively activate the scanning signal lines G1 to Gn. As a result, the scanning signal lines G1 to Gn are sequentially selected one by one, such that the m pixels Pij that are connected to the selected i'th-row scanning signal line are selected collectively. In accordance with the control signal CS2 and the digital image signal DV, the data signal line driver circuit 40 generates drive image signals, which are analog signals, and applies the drive image signals to the data signal lines S1 to Sm. As a result, the drive image signals are written to the pixels Pij upon selection of the scanning signal lines Gi connected to the pixels Pij. Note that the scanning signal line driver circuit 30 and the data signal line driver circuit 40 will also be referred to collectively as "driver circuits".

Furthermore, when the PWM signal generation circuit 50 is provided with a backlight control signal BC from the display control circuit 20, the PWM signal generation circuit 50 generates and outputs a PWM signal PS to the backlight unit 60 in accordance with the backlight control signal BC. Here, the backlight control signal BC defines a frequency, an on/off duty cycle, and an output start point for the PWM signal PS that is to be generated, for each horizontal period. The backlight unit 60 includes a plurality of light-emitting elements (not shown) disposed on a back side of the liquid crystal panel 10, such as light-emitting diodes (LEDs) or cold cathode fluorescent lamps (CCFLs). Each light-emitting element is driven by a PWM signal PS provided by the PWM signal generation circuit 50, so as to backlight the liquid crystal panel 10 with a desired luminance at a desired time. Note that the backlight control signal BC is generated by the display control circuit 20 on the basis of an input image signal and/or a user operation with a predetermined input operation means.

The pixels Pij include TFTs 71, which are connected to the data signal lines S1 to Sm and function as switching elements, and liquid crystal capacitors 72 connected to the TFTs 71. The TFT 71 has a gate terminal connected to the scanning signal line Gi, a source terminal connected to the data signal line Sj, and a drain terminal connected to an electrode of the liquid crystal capacitor 72.

When the scanning signal line Gi is provided with an active scanning signal, the TFTs 71 in the pixels Pij that are connected to the scanning signal line Gi are turned on. As a result, drive image signals being applied to the data signal lines S1 to Sm are written through the TFTs 71 to the liquid crystal capacitors 72 in the pixels Pij that are connected to the scanning signal line Gi. Light emitted by the backlight unit 60 is transmitted through the liquid crystal capacitors 72 to which the drive image signals are being written, with the result that the pixels Pij that are connected to the scanning signal line Gi display an image with a luminance corresponding to a gradation value specified by the input image signal.

In this manner, the scanning signal lines G1 to Gn are sequentially activated one by one, thereby writing drive image signals in all pixels Pij, with the result that the liquid crystal panel displays an image for one frame.

2. Drive Method

Figure 2:
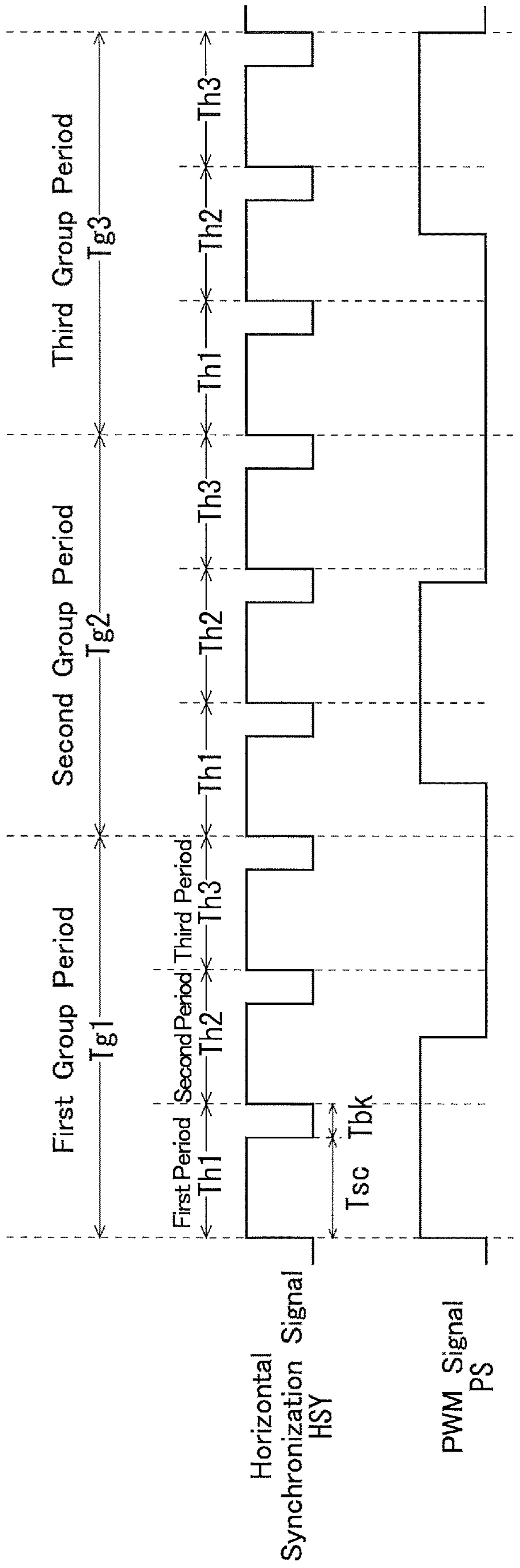
FIG. 2 is a timing chart showing the relationship between a horizontal synchronization signal included in an input image signal and a PWM signal for driving a backlight unit in the liquid crystal display device according to the embodiment.

FIG. 2 is a timing chart showing the relationship between the horizontal synchronization signal HSY included in the input image signal and the PWM signal PS for driving the backlight unit 60. In FIG. 2, when the level of the horizontal synchronization signal HSY becomes HIGH, any one scanning signal line Gi is activated, and when the PWM signal is at an ON level, the backlight unit 60 is lit up. Therefore, normally, one cycle of the PWM signal is matched to one cycle of the horizontal synchronization signal, the drive image signal is written to the pixels Pij that are connected to the activated scanning signal line Gi, and further, backlight illumination is provided, with the result that an image is displayed with a luminance corresponding to the input image signal.

However, in the present embodiment, one cycle of the PWM signal PS is matched to a plurality of cycles of the horizontal synchronization signal HSY. Accordingly, for example, n cycles of the horizontal synchronization signal HSY during one vertical scanning period (i.e., one frame period) are divided into n/k groups (where k is an integer from 2 to n) such that each group consists of k cycles and is matched to one cycle of the PWM signal (n and k are assumed to be selected such that n/k is an integer). Specifically, n horizontal periods corresponding to a horizontal synchronization signal HSY to be used for displaying an image for one frame are divided into a plurality of group periods such that each group period consists of k horizontal periods and is matched to one cycle of the PWM signal.

For example, when k is 3, n horizontal periods included in one vertical scanning period are divided into n/3 group periods such that each group period consists of three horizontal periods, as shown in FIG. 2, and each of the first to (n/3)'th group periods Tg1 to Tg(n/3) is matched to one cycle of the PWM signal. In this case, one cycle of the PWM signal, which is matched to one group period Tgi (where i=1 to n/3), is changed to an ON level (in the present embodiment, HIGH) at a randomly determined point within the group period, and then to an OFF level (in the present embodiment, LOW) after a lapse of a period previously set as an ON period. Accordingly, the point at which the PWM signal is changed to the ON level varies among the group periods, but the point at which the PWM signal is changed to the OFF level is set to be reached during the same group period.

In this manner, each group period Tgi (where i=1 to n/3) consists of three consecutive horizontal periods (hereinafter referred to sequentially as a "first period Th1", a "second period Th2", and a "third period Th3"). Each horizontal period corresponds to one cycle of the horizontal synchronization signal HSY and consists of a horizontal scanning period Tsc and a horizontal blanking period Tbk. The change of the PWM signal PS during each group period Tgi will be described below with reference to FIG. 2.

In the first group period Tg1, the PWM signal PS is changed to the ON level simultaneously with the start of the first period Th1, and remains at the ON level until some point during the second period Th2. At this point, the PWM signal PS is changed from the ON level to the OFF level and remains at the OFF level until the end of the first group period Tg1.

In the second group period Tg2, the PWM signal PS remains at the OFF level from the start of the first period Th1 until some point during the first period Th1, and at this point, the PWM signal PS is changed from the OFF level to the ON level and remains at the ON level until some point during the horizontal blanking period Tbk within the second period Th2. Moreover, at this point, the PWM signal is changed from the ON level to the OFF level and remains at the OFF level until the end of the second group period Tg2.

In the third group period Tg3, the PWM signal PS remains at the OFF level from the start of the first period Th1 until some point during the horizontal scanning period Tsc within the second period Th2, and at this point, the PWM signal PS is changed from the OFF level to the ON level and remains at the ON level until the end of the third group period Tg3. Moreover, the PWM signal PS is changed from the ON level to the OFF level at the end of the third group period Tg3.

Thereafter, the PWM signal PS is similarly changed from the OFF level to the ON level at a random point during each group period until the (n/3)'th group period Tg(n/3). Once the PWM signal PS is changed to the ON level, the PWM signal PS remains at the ON level for a predetermined time period and is changed from the ON level to the OFF level before the end of the same group period. This process will be repeated until all of the first to (n/3)'th group periods Tg1 to Tg(n/3) end, i.e., until the first frame period ends. During the second frame period, the same process will be repeated sequentially from the first to (n/3)'th group periods Tg1 to Tg(n/3).

In this manner, n horizontal periods within one frame period (i.e., one vertical scanning period) are divided into groups of more than one, and each of such group periods is regarded as one cycle. In this case, each group period is regarded as one horizontal period, the horizontal synchronization signal (one cycle of which lasts for one horizontal period) and the PWM signal PS are matched in terms of frequency, and the point at which to change the PWM signal PS from the OFF level to the ON level during each group period is randomly modified. Note that the point at which to change the PWM signal PS to the ON level can be adjusted within a range which allows the PWM signal PS to return to the OFF level during the same group period. It should be noted that randomly modifying the point at which to change the PWM signal from the OFF level to the ON level every group period will also be referred to herein as "modifying timing".

3. Configuration of the PWM Signal Generation Circuit

Figure 3:
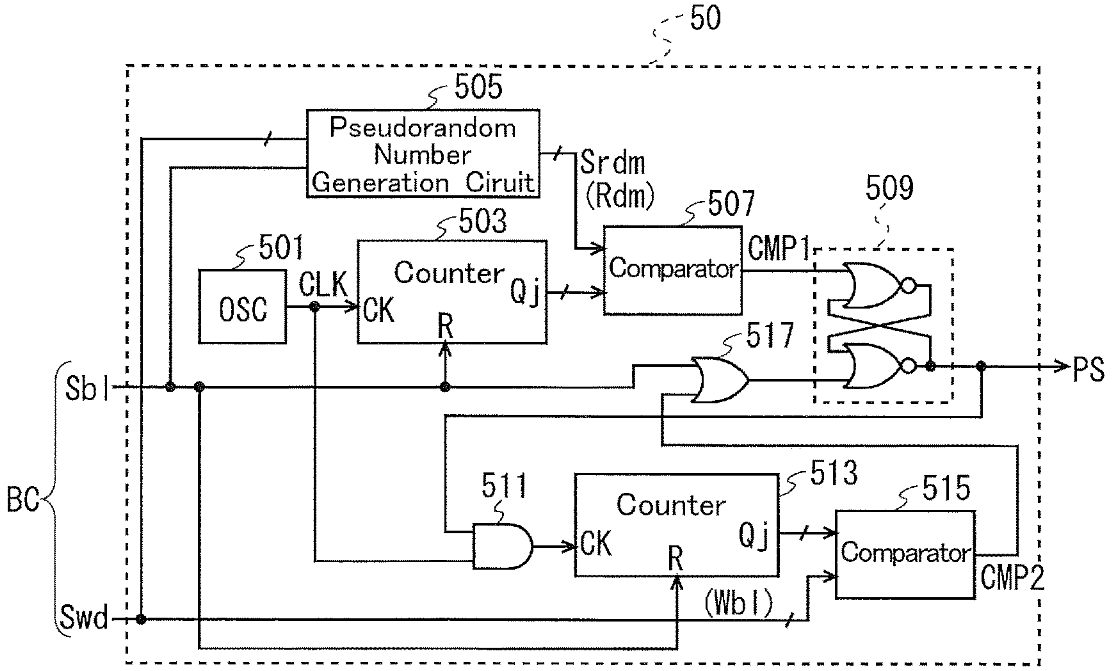
FIG. 3 is a block diagram illustrating a configuration example of a PWM signal generation circuit in the embodiment.
Figure 4:
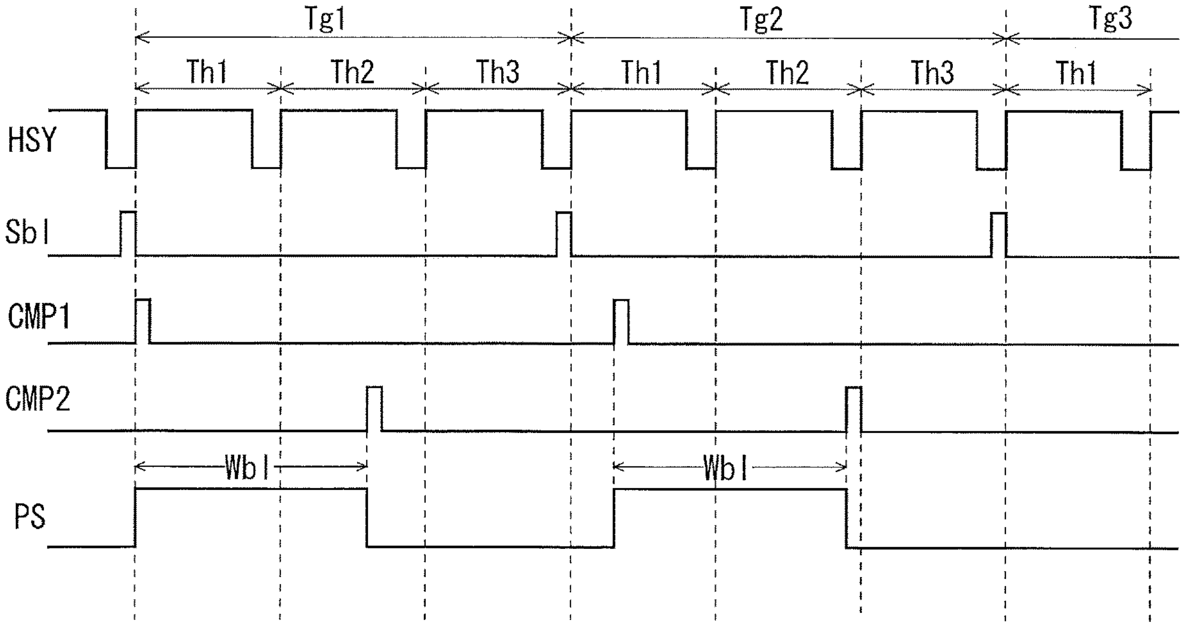
FIG. 4 is a timing chart describing the operation of the PWM signal generation circuit shown in FIG. 3.

The PWM signal generation circuit 50, which generates the PWM signal PS for driving the backlight unit 60, as described above, can be realized by, for example, a configuration as shown in FIG. 3. FIG. 3 is a block diagram illustrating a configuration example of the PWM signal generation circuit 50 in the present embodiment. FIG. 4 is a timing chart describing the operation of the PWM signal generation circuit 50 shown in FIG. 3. The configuration example of the PWM signal generation circuit 50 in the present embodiment will be described below with reference to FIGS. 3 and 4.

The PWM signal generation circuit 50 shown in FIG. 3 includes an oscillator (OSC) 501 for generating a clock signal CLK, a pseudorandom number generation circuit 505, first and second counters 503 and 513, first and second comparators 507 and 515, an SR latch circuit 509, an AND gate 511, and an OR gate 517. The PWM signal generation circuit 50 is provided with a backlight control signal BC from the display control circuit 20, including a BL control timing signal Sb1 and a BL pulse width signal Swd. As shown in FIG. 4, the BL control timing signal Sb1 includes one pulse per three horizontal periods, and the level of the BL control timing signal Sb1 is changed from LOW (L) to HIGH (H) immediately before the end of each group period and back to L at the end of the group period. The BL pulse width signal Swd is a multi-bit digital signal indicating a pulse width Wb1 of the PWM signal PS in units of cycles of the clock signal CLK.

As shown in FIG. 3, the BL control timing signal Sb1 is inputted to the pseudorandom number generation circuit 505 and the OR gate 517, and also inputted to the first and second counters 503 and 513 as reset signals. Moreover, the BL pulse width signal Swd is inputted to the pseudorandom number generation circuit 505 and the second comparator 515. The first counter 503 is reset by the BL control timing signal Sb1 immediately before each group period Tgi (where i=1 to n/3). Thereafter, the first counter 503 starts counting pulses of a clock signal CLK from the oscillator 501 at the start of the group period Tgi, and outputs a count value Qj (where j=1 to p) during the group period Tgi.

The pseudorandom number generation circuit 505 receives the BL control timing signal Sb1 and the BL pulse width signal Swd, and at the fall of each pulse of the BL control timing signal Sb1, the pseudorandom number generation circuit 505 artificially generates a random number Rdm within a predetermined range based on the pulse width Wb1 indicated by the BL pulse width signal Swd and outputs a digital signal Srdm indicating the random number Rdm. Specifically, the digital signal Srdm is outputted with the random number Rdm being an integer of 0 or more but less than a value obtained by subtracting the pulse width Wb1 from the length Wg of one group period (hence the relationship $0 \leq Rdm < Wg - Wb1$ is satisfied). Here, the length and the pulse width of the group period are represented by values in units of cycles of the clock signal CLK from the oscillator 501. Note that the pseudorandom number generation circuit 505 as above can be realized using, for example, a read-only memory (ROM) with random numbers written within a range of values that can be taken by the pulse width Wb1. Alternatively, the pseudorandom number generation circuit 505 can be realized using other hardware such as a linear-feedback shift register.

The first comparator 507 receives the count value Qj (where j=1 to p) of the first counter 503 and the random number Rdm generated by the pseudorandom number generation circuit 505, and outputs a first comparison result signal CMP1, the level of which is H when these values match or L when the values do not match. Accordingly, the first comparison result signal CMP1 includes a pulse whose level is set to H after a lapse of time corresponding to the random number Rdm since the start of the group period Tgi. The pulse is provided to a first input terminal of the SR latch circuit 509. The SR latch circuit 509 receives the BL control timing signal Sb1 at a second input terminal via the OR gate 517, whereby the SR latch circuit 509 is reset immediately before each group period Tgi. Accordingly, the pulse included in the first comparison result signal CMP1 changes the state of the SR latch circuit 509 from reset to set, with the result that the level of an output signal (PS) of the SR latch circuit 509 changes from L to H. As can be appreciated from the above, in this configuration example, the oscillator 501, the first counter 503, and the first comparator 507 constitute a timing determination circuit for determining the time at which to change the level of the PWM signal PS from L to H, on the basis of the random number Rdm.

The clock signal CLK outputted by the oscillator 501 is also provided to one input terminal of the AND gate 511, and the output signal (PS) of the SR latch circuit 509 is provided to the other input terminal of the AND gate 511. The AND gate 511 provides an output signal to a clock terminal CK of the second counter 513. As a result, only while the level of the output signal of the SR latch circuit 509, i.e., the PWM signal PS, is being set at H, the clock signal CLK from the oscillator 501 is inputted to the second counter 513. Accordingly, once the level of the first comparison result signal CMP1 is changed to H, the second counter 513 starts counting pulses of the clock signal CLK and outputs the count value Qj (where j=1 to p) during the group period Tgi.

The second comparator 515 receives the count value Qj (where j=1 to p) of the second counter 513 and a value for the pulse width Wb1 indicated by the BL pulse width signal Swd, and outputs a second comparison result signal CMP2, the level of which is H when these values match or L when the values do not match. Accordingly, the second comparison result signal CMP2 includes a pulse whose level is set to H after a lapse of time corresponding to the pulse width Wb1 since the level change of the output signal (PS) to H during the group period Tgi. The pulse is provided to the second input terminal of the SR latch circuit 509 via the OR gate 517. As a result, the SR latch circuit 509 is reset, and the level of the output signal (PS) thereof is changed to L. As can be appreciated from the above, in this configuration example, the oscillator 501, the AND gate 511, the second counter 513, and the second comparator 515 constitute a timing determination circuit for determining the time at which to change the level of the PWM signal PS, which is the output signal of the SR latch circuit 509, from H to L.

In this manner, during each group period Tgi, the level of the PWM signal PS, which is the output signal of the SR latch circuit 509, is changed to H at the rise of the pulse of the first comparison result signal CMP1 and also changed to L at the rise of the pulse of the second comparison result signal CMP2. Accordingly, the duration from the start of each group period Tgi until the level change of the PWM signal PS to H is determined randomly on the basis of the random number Rdm generated by the pseudorandom number generation circuit 505, and the duration from the point at which the level of the PWM signal PS is changed to H until the point at which the level of the PWM signal PS is changed to L is determined by the pulse width Wb1 indicated by the BL pulse width signal Swd. Note that as has already been described, the pseudorandom number generation circuit 505 generates the random number Rdm such that the relationship $0 \leq Rdm < Wg - Wb1$ is satisfied, and therefore the level of the PWM signal PS is changed to H during each group period Tgi and thereafter back to L during the same group period Tgi.

As can be appreciated from the above, by using the PWM signal generation circuit 50 configured as shown in FIG. 3, it is rendered possible to drive the backlight unit 60 in the manner described with reference to FIG. 2. Note that the configuration of the PWM signal generation circuit 50 is not limited to the configuration example shown in FIG. 3, and it is simply required to configure the PWM signal generation circuit 50 such that the level of the PWM signal PS is changed from L to H after a lapse of a random period of time (including zero) from the start of each group period Tgi, and changed back to L after a lapse of time corresponding to the pulse width Wb1 indicated by the BL pulse width signal Swd. Moreover, in the configuration shown in FIG. 1, the PWM signal generation circuit 50 is an independent component from the display control circuit 20, but the PWM signal generation circuit 50 may be included in the display control circuit 20.

4. Change in Screen Luminance

Figure 5:
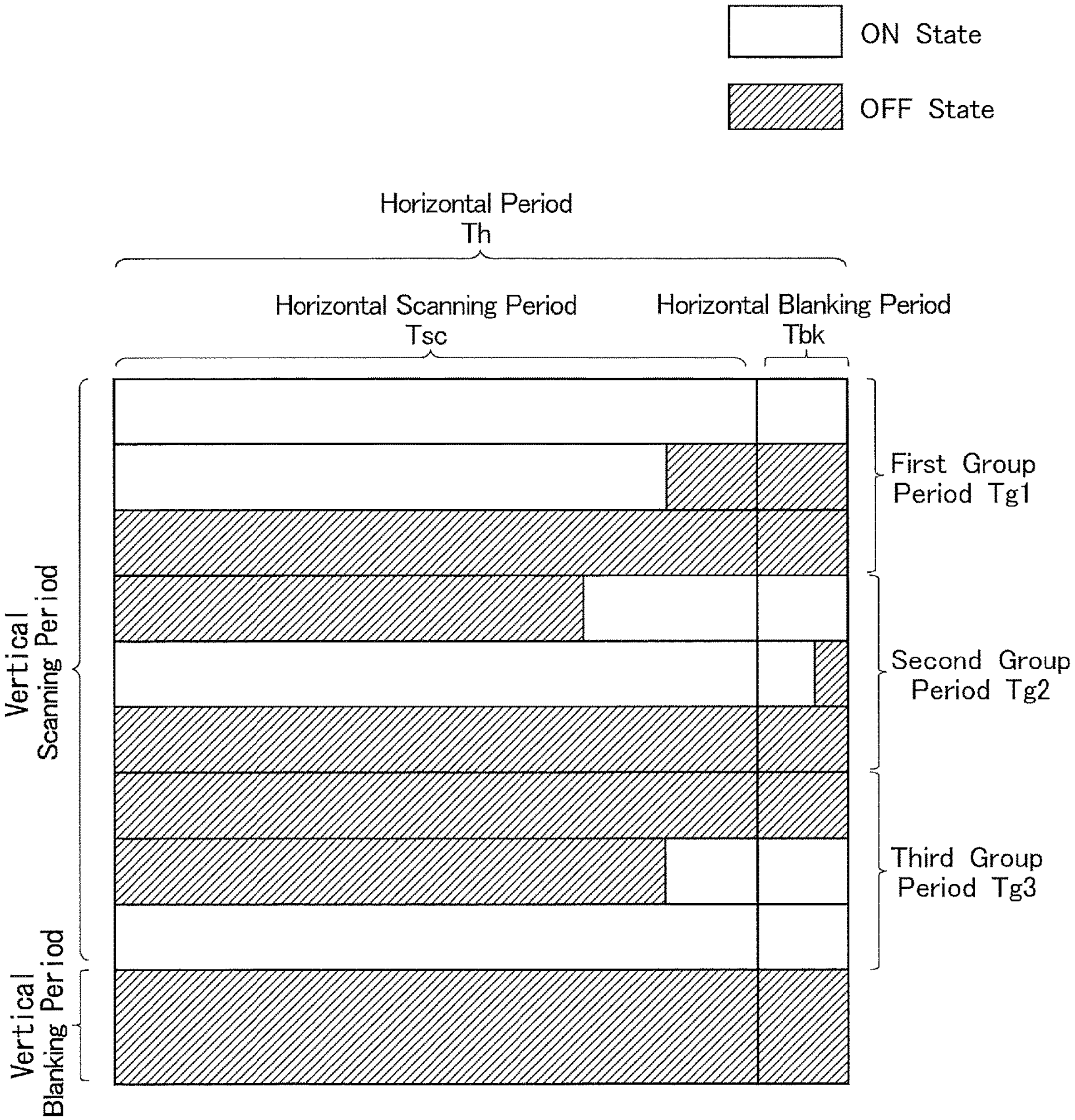
FIG. 5 is a diagram showing ON and/or OFF periods for each horizontal period where the backlight unit is lit up in accordance with the timing chart shown in FIG. 2.

FIG. 5 is a diagram showing ON and/or OFF periods for each horizontal period where the backlight unit 60 is driven in accordance with the timing chart shown in FIG. 2. In FIG. 5, white areas represent periods during which the level of the PWM signal is ON, i.e., the backlight is ON or lit up, and shaded areas represent periods during which the level of the PWM signal is OFF, i.e., the backlight is OFF or not lit up. Moreover, in FIG. 5, rectangles that represent the ON and/or OFF states of the backlight in the horizontal periods (each rectangle consists of a rectangular part corresponding to the horizontal scanning period Tsc and another rectangular part corresponding to the horizontal blanking period Tbk) are vertically arranged in accordance with the order of the scanning signal lines G1 to Gn. Accordingly, in FIG. 5, the left-right direction corresponds to a time axis of each horizontal period, and the top-bottom direction corresponds to a time axis in units of one horizontal period. Note that the backlight unit 60 uniformly illuminates the entire back of the liquid crystal panel 10.

FIG. 5 shows the ON and OFF states of the backlight for nine horizontal periods included in the first to third group periods Tg1 to Tg3, each group period consisting of first to third horizontal periods, as shown in FIG. 2.

Each group period is the same in terms of the time for which the backlight is lit up, but different in terms of the time at which the backlight is lit up. Moreover, even in the same group period, the time for which the backlight is lit up differs for each horizontal period. Note that the luminance of each pixel within one frame varies depending on the gradation value included in the input image signal, but descriptions herein will be given on the assumption that the gradation value is constant among all pixels.

Furthermore, during the first of the three horizontal periods within the first group period Tg1, the backlight is constantly lit up, and therefore the first pixel row (first display line) consisting of pixels connected to the first scanning signal line G1 being selected during the first horizontal period has a high liquid crystal application voltage (effective value), whereby an image is displayed with a high luminance. In the third horizontal period, the backlight is not lit up, and therefore the third pixel row (third display line) consisting of pixels connected to the third scanning signal line G3 being selected during the third horizontal period has a low liquid crystal application voltage (effective value), whereby an image is displayed with a low luminance. In the second horizontal period, the backlight is lit up for some time and turned off for the rest, and therefore the second pixel row (second display line) consisting of pixels connected to the second scanning signal line G2 being selected during the second horizontal period displays an image with an intermediate luminance between the luminances for the first and third pixel rows (i.e., the first and third display lines). Similarly, other group periods include horizontal periods during which the backlight is constantly lit up, the backlight is turned off, or the backlight is lit up for some time and turned off for the rest.

Figure 6:
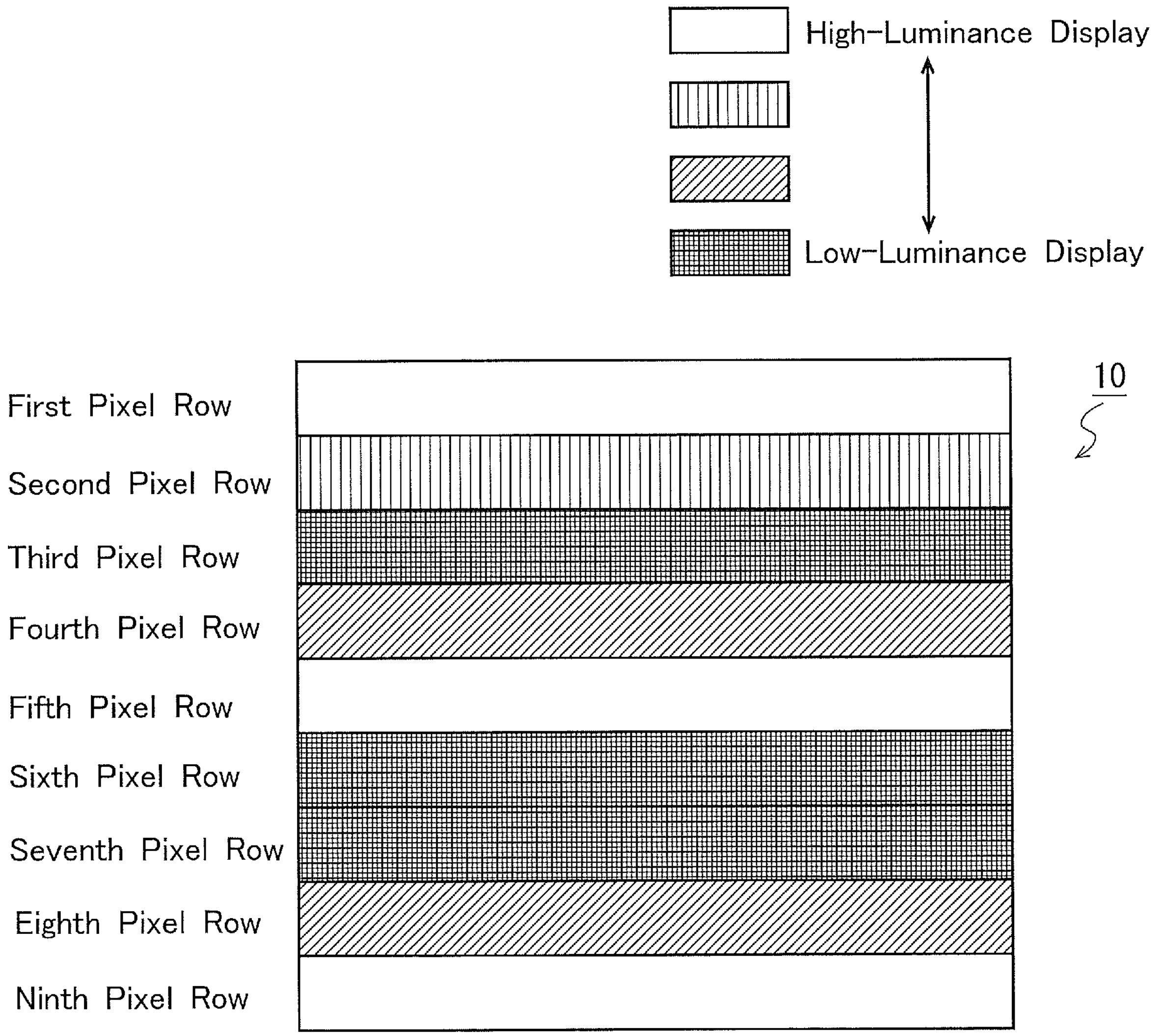
FIG. 6 is a diagram illustrating pixel row image luminances as seen by a viewer where the backlight is turned on or off as shown in FIG. 5.
Figure 7:
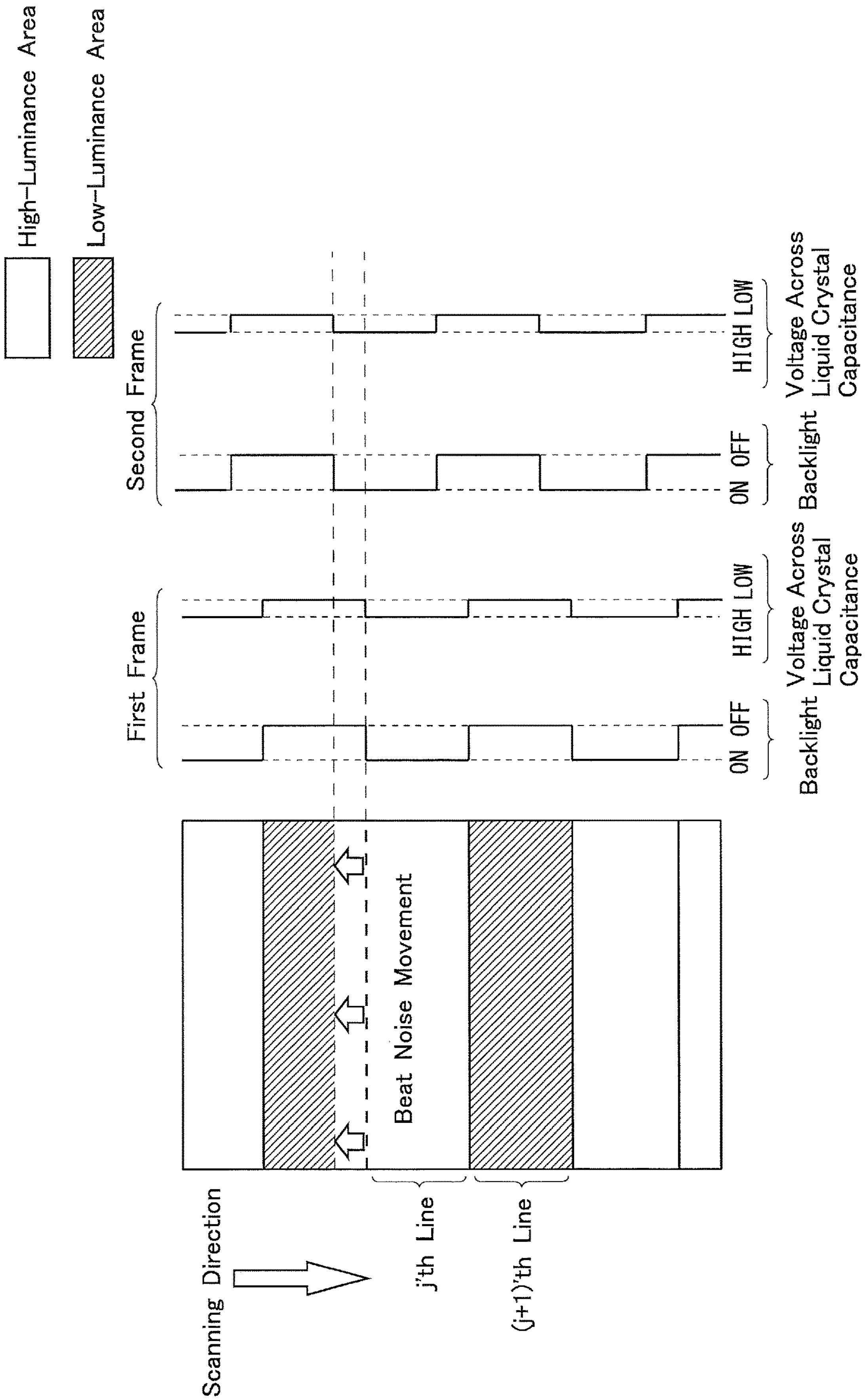
FIG. 7 is a diagram illustrating a conventional example of the occurrence of beat noise due to a frequency difference between a PWM signal and a horizontal synchronization signal.

FIG. 6 is a diagram illustrating pixel row image luminances as seen by a viewer where the backlight is lit up and/or turned off as shown in FIG. 5. In this display example shown in FIG. 6, as has already been described, the gradation value indicated by the input image signal (more specifically, image data DAT included in the input image signal) is the same among all pixels. The backlight state (ON or OFF) does not change during the first and third horizontal periods respectively corresponding to the first and third pixel rows (i.e., the first and third periods within the first group period Tg1), as shown in FIG. 5. In such a case, the viewer sees an image with the first and third pixel rows having respective luminances shown in FIG. 6. On the other hand, the backlight state (ON or OFF) changes some time during the second and fourth horizontal periods respectively corresponding to the second and fourth pixel rows (i.e., the second period within the first group period Tg1 and the first period within the second group period Tg2), as shown in FIG. 5. In such a case, during each of the second and fourth horizontal periods, the viewer sees an image with the corresponding second or fourth pixel row having an intermediate luminance between luminances of that pixel row before and after the luminance change, as shown in FIG. 6.

In this manner, the n horizontal periods corresponding to the n scanning signal lines are divided into groups of three such that the three horizontal periods in each group constitute a group period that is regarded as one horizontal period, and the timing of the PWM signal is modified for each group period. Thus, the brightness of line images to be displayed in respective pixel rows can be randomly changed on a line-by-line basis such that the line images are displayed as a mosaic-like stripe pattern, whereby luminance differences between the lines are rendered indiscernible.

5. Effects

In the present embodiment, when one group period including a plurality of horizontal periods is regarded as one horizontal period, the horizontal synchronization signal and the PWM signal are matched in terms of frequency, and the time at which to change the level of the PWM signal PS from OFF to ON is randomly modified for each group period. As a result, the brightness of line images to be displayed in respective pixel rows is randomly changed on a line-by-line basis such that the line images are displayed as a mosaic-like stripe pattern (see FIG. 6). Thus, luminance differences between the lines are rendered indiscernible to the viewer, thereby rendering it possible to achieve improved quality of image display on the screen of the liquid crystal panel.

While the invention has been described in detail, the foregoing description is in all aspects illustrative and not restrictive. It is understood that numerous other modifications and variations can be devised without departing from the scope of the invention.

What is claimed is:

1. A display device comprising:
- a display portion with a plurality of pixels disposed thereon for image display;
- a driver circuit configured to drive the pixels based on an externally provided input image signal;
- a backlight unit configured to backlight the pixels and disposed on a back side of the display portion; and
- a PWM signal generation circuit configured to receive a backlight control signal and generate a PWM signal in accordance with the backlight control signal such that the backlight unit is driven with a luminance controlled by the PWM signal, wherein,
- the PWM signal generation circuit divides a plurality of horizontal periods corresponding to a horizontal synchronization signal to be used for displaying an image for one frame, into a plurality of group periods each consisting of two or more horizontal periods, and generates the PWM signal such that the PWM signal is equal in frequency to the horizontal synchronization signal when the two or more horizontal periods included in each group period are regarded as one horizontal period, and such that the PWM signal is randomly modified every group period in terms of a time at which to change the PWM signal from an OFF level at which the backlight unit is turned off to an ON level at which the backlight unit is lit up, and
- the PWM signal generation circuit includes:
- a pseudorandom number generation circuit configured to artificially generate a random number every group period; and
- a timing determination circuit configured to determine a time at which to change the PWM signal from the OFF level to the ON level for each group period, based on the random number generated by the pseudorandom number generation circuit.

2. The display device according to claim 1, wherein the PWM signal generation circuit generates the PWM signal such that the PWM signal is changed from the OFF level to the ON level once per group period.

3. The display device according to claim 1, wherein the PWM signal generation circuit generates the PWM signal such that the PWM signal is changed from the OFF level to the ON level during each group period and thereafter from the ON level to the OFF level during the each group period.

4. The display device according to claim 1, wherein the PWM signal generation circuit generates the PWM signal such that the duration of the PWM signal being at the ON level during each group period is changed in accordance with the backlight control signal.

* * * * *